United States Patent
Wani et al.

(10) Patent No.: US 12,249,885 B2
(45) Date of Patent: Mar. 11, 2025

(54) CIRCUMFERENTIAL ARRANGEMENT OF STATOR WINDING END LEADS

(71) Applicant: Cummins Generator Technologies Limited, Peterborough (GB)

(72) Inventors: Yogesh Wani, Peterborough (GB); Peethamparam Anpalahan, Peterborough (GB); Darren Camilleri, Peterborough (GB); Narasimha Saraswati, Peterborough (GB); Hu Guoqing, Peterborough (GB); Lake Zhao, Peterborough (GB)

(73) Assignee: Cummins Generator Technologies Limited, Peterborough (GB)

( * ) Notice: Subject to any disclaimer, the term of this patent is extended or adjusted under 35 U.S.C. 154(b) by 594 days.

(21) Appl. No.: 17/309,029

(22) PCT Filed: Oct. 14, 2019

(86) PCT No.: PCT/GB2019/052917
§ 371 (c)(1),
(2) Date: Apr. 15, 2021

(87) PCT Pub. No.: WO2020/079408
PCT Pub. Date: Apr. 23, 2020

(65) Prior Publication Data
US 2022/0014064 A1    Jan. 13, 2022

Related U.S. Application Data (60) Provisional application No. 62/749,754, filed on Oct. 24, 2018.

(30) Foreign Application Priority Data

Oct. 16, 2018    (GB) ..................................... 1816855

(51) Int. Cl.
*H02K 3/50* (2006.01)
*H02K 3/38* (2006.01)
(Continued)

(52) U.S. Cl.
CPC ................. *H02K 3/50* (2013.01); *H02K 3/38* (2013.01); *H02K 3/48* (2013.01); *H02K 5/225* (2013.01); *H02K 2203/06* (2013.01)

(58) Field of Classification Search
CPC .. H02K 3/50; H02K 3/48; H02K 3/38; H02K 5/225; H02K 2203/06
(Continued)

(56) References Cited

U.S. PATENT DOCUMENTS

| | | |
|---|---|---|
| 2,747,118 A | 5/1956 | Coggeshall et al. |
| 3,145,317 A | 8/1964 | Blohm et al. |

(Continued)

FOREIGN PATENT DOCUMENTS

| | | |
|---|---|---|
| DE | 26 06 401 | 9/1976 |
| DE | 19732949 A1 | 2/1999 |

(Continued)

OTHER PUBLICATIONS

International Search Report and Written Opinion for International Application No. PCT/GB2019/052917, mail date Nov. 26, 2019, 12 pages.

(Continued)

*Primary Examiner* — Michael Andrews
(74) *Attorney, Agent, or Firm* — Foley & Lardner LLP (57) ABSTRACT

A stator for a rotating electrical machine is disclosed, the stator comprising a stator core (16) comprising stator slots and a plurality of stator coils. The stator coils comprise side windings (17) located in the stator slots, end windings (18) which extend out of the stator slots, and end leads (28) for connecting the stator coils. The end leads (28) run circum- (Continued)

ferentially around a radially outwards side of the end windings (18). A spacer (34) may be provided to space the end leads from each other and from the end windings. This may help to improve cooling, help to improve electrical separation, and may be more efficient in terms of space requirements and ease of manufacture than previous arrangements.

15 Claims, 7 Drawing Sheets (51) Int. Cl.
  *H02K 3/48* (2006.01)
  *H02K 5/22* (2006.01)
(58) Field of Classification Search
  USPC .......................................................... 310/71
  See application file for complete search history.

(56) References Cited

U.S. PATENT DOCUMENTS

| | | | | |
|---|---|---|---|---|
| 4,219,748 | A * | 8/1980 | Sakaguchi | H02K 3/50 |
| | | | | 310/260 |
| 4,314,173 | A * | 2/1982 | Srdoch | H02K 3/505 |
| | | | | 310/260 |
| 4,656,378 | A | 4/1987 | Atherton et al. | |
| 4,943,749 | A * | 7/1990 | Ponce | H02K 5/225 |
| | | | | 310/260 |
| 2005/0253466 | A1 | 11/2005 | Seguchi et al. | |
| 2009/0200888 | A1* | 8/2009 | Tanaka | H02K 3/28 |
| | | | | 310/195 |
| 2011/0012450 | A1 | 1/2011 | Umeda et al. | |
| 2012/0126649 | A1* | 5/2012 | Kn | H02K 3/505 |
| | | | | 310/91 |
| 2013/0069458 | A1* | 3/2013 | Stallone | H02K 3/505 |
| | | | | 310/71 |
| 2015/0381000 | A1 | 12/2015 | Tamura | |
| 2016/0079822 | A1* | 3/2016 | Noguchi | F04D 13/06 |
| | | | | 310/71 |

FOREIGN PATENT DOCUMENTS

| | | |
|---|---|---|
| DE | 10 2016 211 599 | 12/2017 |
| EP | 0 375 419 | 6/1990 |
| JP | S56-133245 U | 10/1981 |
| JP | H08-280149 | 10/1996 |
| JP | 2003-324887 A | 11/2003 |
| JP | 2009-118615 A | 5/2009 |
| JP | 2009-278848 | 11/2009 |
| JP | 2015-111975 | 6/2015 |

OTHER PUBLICATIONS

Search Report for United Kingdom Application No. 1816855.9, mail date Mar. 8, 2019, 2 pages.
CN Office Action issued in Chinese Appl. Ser. No. 201980057256.7 Dated Jul. 4, 2024 (24 pages).

* cited by examiner

CIRCUMFERENTIAL ARRANGEMENT OF STATOR WINDING END LEADS

This application is a National Stage Entry of International Application No. PCT/GB2019/052917, filed Oct. 14, 2019, which claims priority to and the benefit of United Kingdom patent application No. 1816855.9 filed Oct. 16, 2018 and U.S. provisional application No. 62/749,754 filed Oct. 24, 2018. The entire contents of these applications are incorporated herein by reference.

The present disclosure relates to a winding arrangement for a stator in a rotating electrical machine, and in particular a winding arrangement which can help to reduce temperature rises and improve cooling of the machine.

Rotating electrical machines, such as motors and generators, generally comprise a rotor mounted on a shaft and arranged to rotate inside a stator. The rotor comprises a rotor core which holds rotor windings or permanent magnets. The rotor windings or permanent magnets produce a rotating magnetic field which crosses an air gap between the rotor and the stator. The stator comprises a stator core which holds stator windings which combine with the rotating magnetic field.

In a rotating electrical machine, the stator windings are normally accommodated in stator slots which extend axially through the stator core. Typically, the stator windings comprise a number of coils disposed circumferentially about the stator. The coils may be wound in the slots in situ, or else pre-formed coils may be inserted into the slots. In either case, it is necessary for the windings to exit one slot and pass around the outside of the stator before entering another slot. The parts of the windings which run through the slots are usually referred to as side windings, while the parts of the windings which extend outside of the stator are usually referred to as end windings or overhang windings. Coil end leads are normally provided for connection purposes.

It is usually necessary to bring some or all of the coil end leads out of the stator for connection to external components. The number of end leads taken out depends on the connection style, parallel path, voltage requirements and so forth. The end leads are usually routed circumferentially around the stator in order to bring them to a common connection point such as a terminal box. The end leads from different coils are normally bunched together in a ring adjacent to the end windings in an axial direction.

The power rating of an electrical machine is often limited by the temperature rise of the stator and rotor when the machine is in use. Furthermore, machines generally operate more efficiently at lower temperatures. In addition, the machine lifespan may be reduced if the machine is operated at high temperatures. Thus many machines are arranged to have air flow through the machine, in order to cool the machine.

In a rotating electrical machine the stator normally acts as the armature and carries the main electrical power. As a consequence, the end leads of a stator may be required to carry large currents. This, coupled with the fact that the end leads are usually bunched together, can lead to large temperature rises in the end windings. This is turn may lead to an overall temperature rise in the machine.

In a multi-phase electrical machine, the stator windings include separate windings for each phase. This may result in the end leads of different phases lying adjacent to each other as they are routed around the stator. In operation, each of the phases is at a different electrical potential. It is therefore necessary to ensure that there is sufficient electrical insulation between the end leads of different phases.

The individual wires in the stator windings are usually electrically insulated by means of an outer insulation layer, which is typically enamel. Additional insulation may also be provided on the end leads. However, faults may develop in the outer insulation layer either due to the manufacturing process, or due to stresses imposed on the wires during construction or use of an insertion tool. Furthermore, electrical insulation may deteriorate over time from thermal, mechanical and environmental stresses. In the case of end leads at different electrical potentials, this could lead to arcing between the windings. This would make the machine inefficient and could lead to the machine being damaged and ultimately machine failure. While in principle the risk of arching could be reduced by increasing the amount of insulation, this would reduce the amount of copper for a given size of conductor, which would reduce efficiency and could lead to further temperature rises.

It is known to provide connector rings for connecting individual stator coils to each other and to output terminals. However, such connector rings require additional connections to be made, which increases the complexity of the manufacturing process. Furthermore, such connector rings typically add to the overall size of the machine.

It would therefore be desirable to provide a winding arrangement which can help to reduce temperature rises in the coil end leads. It would also be desirable to provide a winding arrangement in which greater electrical separation can be achieved between end leads of different phases, without impacting on thermal performance. In addition, it would be desirable to provide a winding arrangement which is efficient in terms of space requirements and ease of manufacture.

According to one aspect of the present invention there is provided a stator for a rotating electrical machine, the stator comprising:
  a stator core comprising stator slots; and
  a plurality of stator coils, the stator coils comprising side windings located in the stator slots, end windings which extend out of the stator slots, and end leads for connecting the stator coils;
  wherein at least some of the end leads run circumferentially around a radially outwards side of the end windings.

The present invention may provide the advantage that, by running the end leads circumferentially around a radially outwards side of the end windings, it may be possible to improve the cooling of the end leads and/or end windings. This in turn may help to improve the machine life and/or enhance the power density of the machine. Furthermore, it may be possible to improve the electrical separation between the phases in a multiphase machine. In addition, it may be possible to make the winding arrangement more efficient in terms of space requirements and/or ease of manufacture.

The end leads are preferably located on the radially outwards side of the end windings. This may help to ensure that the end leads lie in an area of relative high airflow, and thus may allow more cooling air to come into contact with the end leads. However, in some circumstances, some of the end leads may be located on the radially inwards side of the end windings. It may also be possible for some of the end leads to be axially outwards of the end windings.

Preferably the side windings extend through the stator slots (for example in a substantially axial direction). Preferably the end windings extend out of one stator slot and into another. The end windings may run in a substantially circumferential direction between stator slots. The end leads are preferably the end leads of respective coils. The end leads may be provided with terminals for connection to other components. Preferably the end leads are arranged to connect to an external component such as a terminal box.

In order to connect the stator windings to a component such as a terminal box, it is normally necessary to run the end windings circumferentially around the stator. Thus, the end leads may run circumferentially at least part way around the outside of the end windings.

Each stator coil is preferably wound from a single continuous conductor. Thus each end lead is preferably part of the same continuous conductor as the side windings and the end windings. This can avoid the need to make additional connections or for a separate conductor ring, which may help with space efficiency and/or ease of manufacture.

In a preferred embodiment, each coil is formed from a single continuous wire wound in a series of turns. The wire may be for example a metal wire such as a copper wire. Thus, each stator coil may be wound from a wire which forms the side windings, end windings and end leads. This may help with space efficiency and/or ease of manufacture. However, if desired, it would be possible to make the coils from two or more lengths of wire.

Preferably the end leads are arranged in a row (for example in a substantially axial direction) along the outside of the end windings. The row may comprise, for example, a plurality of end leads in a substantially axial direction and a single end lead in a substantially radial direction, although other arrangements (such as two or more end leads in a radial direction) are also possible. Arranging the end leads in a row (rather than being grouped together) may allow more cooling air to come into contact with the end leads, thereby improving the cooling.

Preferably the end leads from different coils are spaced apart from each other. This may allow air flow to pass between adjacent end leads, thereby improving the cooling of the end leads and/or the end windings. Furthermore, spacing the end leads apart from each other may improve electrical separation.

In one embodiment of the invention the machine is a multiphase machine, and end leads of different phases are spaced apart from each other. In this case embodiments of the invention may help to improve the electrical separation between the phases. However, the machine may instead be single phase, or have any other number of phases.

In some circumstances it may be possible for the end leads to rest directly on the end windings. In this case, if desired, an insulating barrier such as a composite sheet of meta-aramid material may be placed between the end windings and the end leads. However, in a preferred embodiment, the end leads are spaced away from the end windings. This can allow a passage for air flow to be present between the end leads and the end windings, which may help with cooling both the end windings and the end leads.

The stator may further comprise a spacer between the end windings and the end leads. The spacer may be provided to space the end leads from each other and/or from the end windings. The spacer is preferably arranged to separate the end leads from the end windings, thereby creating an air gap between the two. This can provide a passage for air flow between the end windings and the end leads, thereby assisting with cooling.

The spacer may also be arranged to provide an air gap between adjacent end leads (for example in an axial direction). These gaps may provide passages for cooling air to come in contact with the end windings and the end leads, which may help to ensure effective cooling.

Preferably the spacer is arranged to hold the end leads in place relative to each other and/or to provide electrical insulation between adjacent end leads. For example, the spacer may comprise a base and a plurality of upright elements. In this case, the end leads may be accommodated between adjacent upright members. This can allow the end leads to be held in place, and/or gaps to be provided between adjacent end leads, as well as spacing the end leads apart from the end windings.

Preferably the base of the spacer extends in a direction which is substantially parallel to the axis of rotation of the machine. The upright members preferably extend outwards from the base in a substantially radial direction. The upright members are preferably arranged at spaced locations along the base.

The upright members may be arranged in pairs. The upright members of a pair may be adjacent to each other in a circumferential direction. In this case, an air gap may be present between the upright members of a pair. This may help to align the end leads, while allowing air flow over the end leads between the two members of a pair. Furthermore, if a holding means such as a tie or lacing is used to hold the end leads on the end windings, then the holding means may pass between the upright members of a pair. This may help to ensure that the holding means stays in place, and that the end leads, the spacer and the end windings are held together.

Preferably pairs of upright members are adjacent to each other in an axial direction, with a gap therebetween. The end leads are preferably accommodated between adjacent pairs of upright members.

The base of the separator may comprise an axial air passage. This may further assist with cooling and/or reduce the amount of material used in the spacer.

Preferably a plurality of spacers are provided between the end windings and the end leads. The spacers may be located at spaced locations circumferentially around the stator. This may help to ensure that consistent air gaps are provided between the end windings and the end leads.

Preferably holding means are provided for holding the end leads on the end windings. For example, ties or lacing may be used to hold the end leads on the end windings. This may also help to hold the spacer in place. Thus, the spacer may be held between the end windings and the end leads, preferably without the need for a separate mounting means.

According to another aspect of the present invention there is provided a rotating electrical machine comprising a rotor and a stator in any of the forms described above. The rotating electrical machine may be a motor or a generator, or both. The machine may comprise a terminal box, and some or all of the end leads may be connected to terminals in the terminal box. The connection side of the machine may be at the non-drive end, or the drive end, or both.

Corresponding methods may also be provided. Thus, according to another aspect of the invention, there is provided a method of manufacturing a stator for a rotating electrical machine, the method comprising inserting coils into a stator core such that end windings extend out of stator slots, and routing coil end leads circumferentially around the radially outwards side of the end windings.

Features of one aspect of the invention may be provided with any other aspect. Apparatus features may be provided with method aspects and vice versa.

In the present disclosure, terms such as "radial", "axial" and "circumferential" are generally defined with reference to the axis of rotation of the rotating electrical machine, unless the context implies otherwise.

Preferred embodiments of the present invention will now be described, purely by way of example, with reference to the accompanying drawings, in which.

Figure 1:
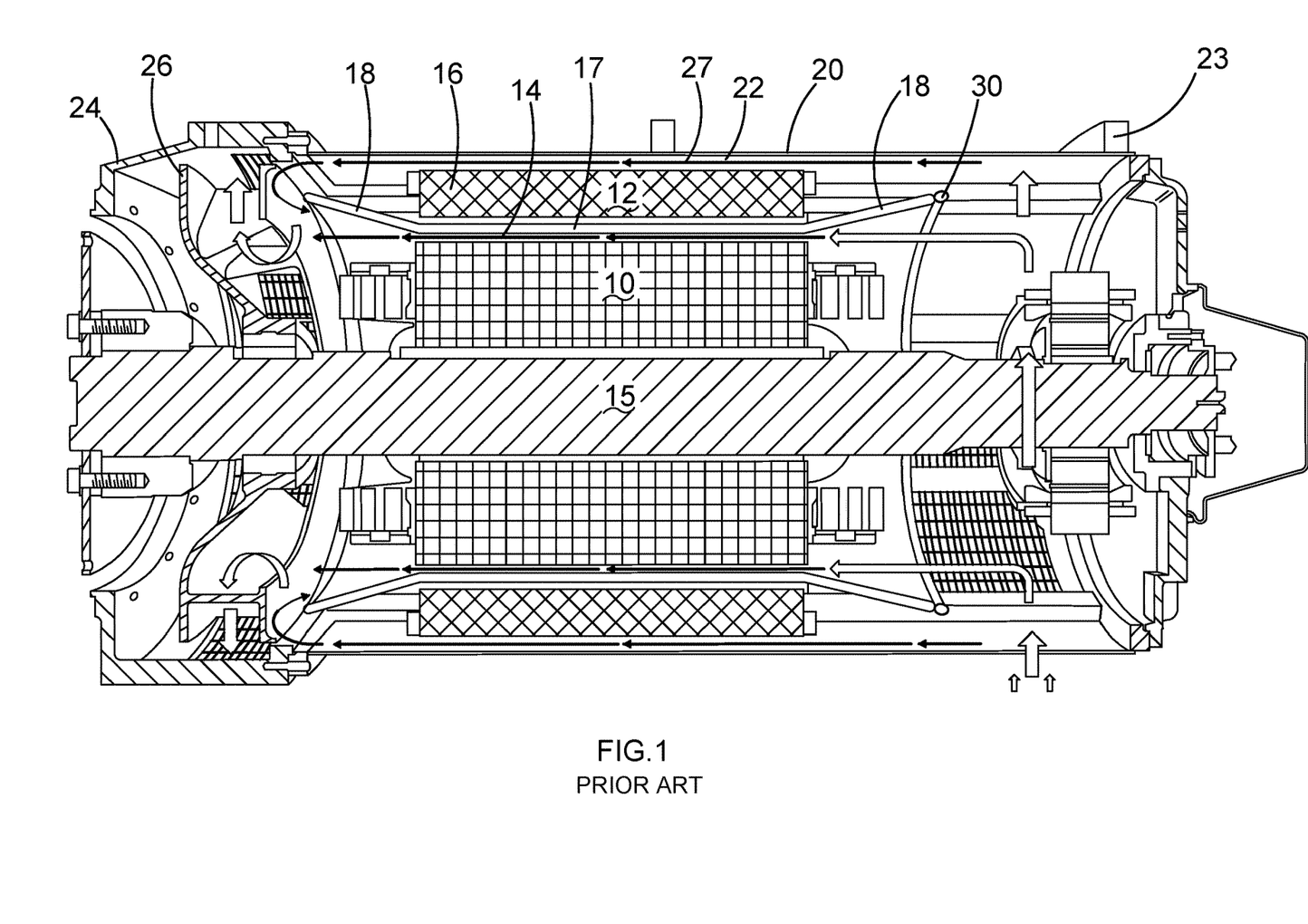
FIG. 1 shows a longitudinal cross section through parts of a known rotating electrical machine.

FIG. 1 shows a longitudinal cross section through parts of a known rotating electrical machine. A typical example is an alternator. Referring to FIG. 1, the machine comprises a rotor 10 located inside a stator 12 with an air gap 14 between the two. The rotor is mounted on a shaft 15 with an axis of rotation indicated by the dashed line. The stator 12 comprises a stator core 16 with slots on its inner circumference which extend in a substantially axial direction. Stator windings 17 are located in the stator slots. End windings 18 extend out of the stator slots at each end of the stator core. The end windings 18 extend around the outside of the stator core in a substantially circumferential direction. The stator 12 is contained within a substantially cylindrical stator frame 20. Air gaps 22 are provided between the stator core 16 and the stator frame 20.

In this example the electrical machine is a synchronous generator which is driven by a prime mover such as a diesel engine. A drive end adaptor 24 is located at the drive end of the electrical machine, and is used to connect the machine to the prime mover. The drive end adaptor 24 is bolted to the stator frame 20. A fan 26 is mounted on the shaft 15 inside the drive end adaptor 24.

In operation, the fan 26 draws air flow through the machine in order to provide cooling. This air flow is predominately in an axial direction through the rotor/stator air gap 14 and the stator/frame air gap 22, as indicated by the arrows 27 in FIG. 1. For a typical machine 70% of the airflow through the machine is through the stator/frame air gap, while 30% of the airflow is through the rotor/stator air gap.

Alternatively, the fan may push air through the machine, in which case air flow would be in the opposite direction. If desired, an external, independently-driven fan or fans could be used instead of a shaft driven fan.

In a machine such as that shown in FIG. 1, the stator windings typically comprise a number of coils distributed around the stator. For example, in a stator with 36 stator slots and double layer windings, a total of 36 coils may be present.

Each coil is normally formed from a single continuous conductor, such as a copper wire, wound into a series of turns. The winding process may be carried out prior to insertion of the coil into the stator slots, or in situ. Each coil comprises side windings which run axially through the stator slots, end windings which extend out of the stator slots and circumferentially around the end of the stator core, and end windings which are used to connect the coil. It is necessary to bring some or all of the coil end leads outside of the stator for connection purposes (depending on the connection style). In the arrangement of FIG. 1, the coil end leads are brought to a terminal box 23 (partially shown in FIG. 1). This is done by routing the coil end leads circumferentially around the stator at the non-drive end of the machine. The end leads from the various coils in the stator windings are bunched together in a ring 30 adjacent to the end windings in an axial direction.

Figure 2:
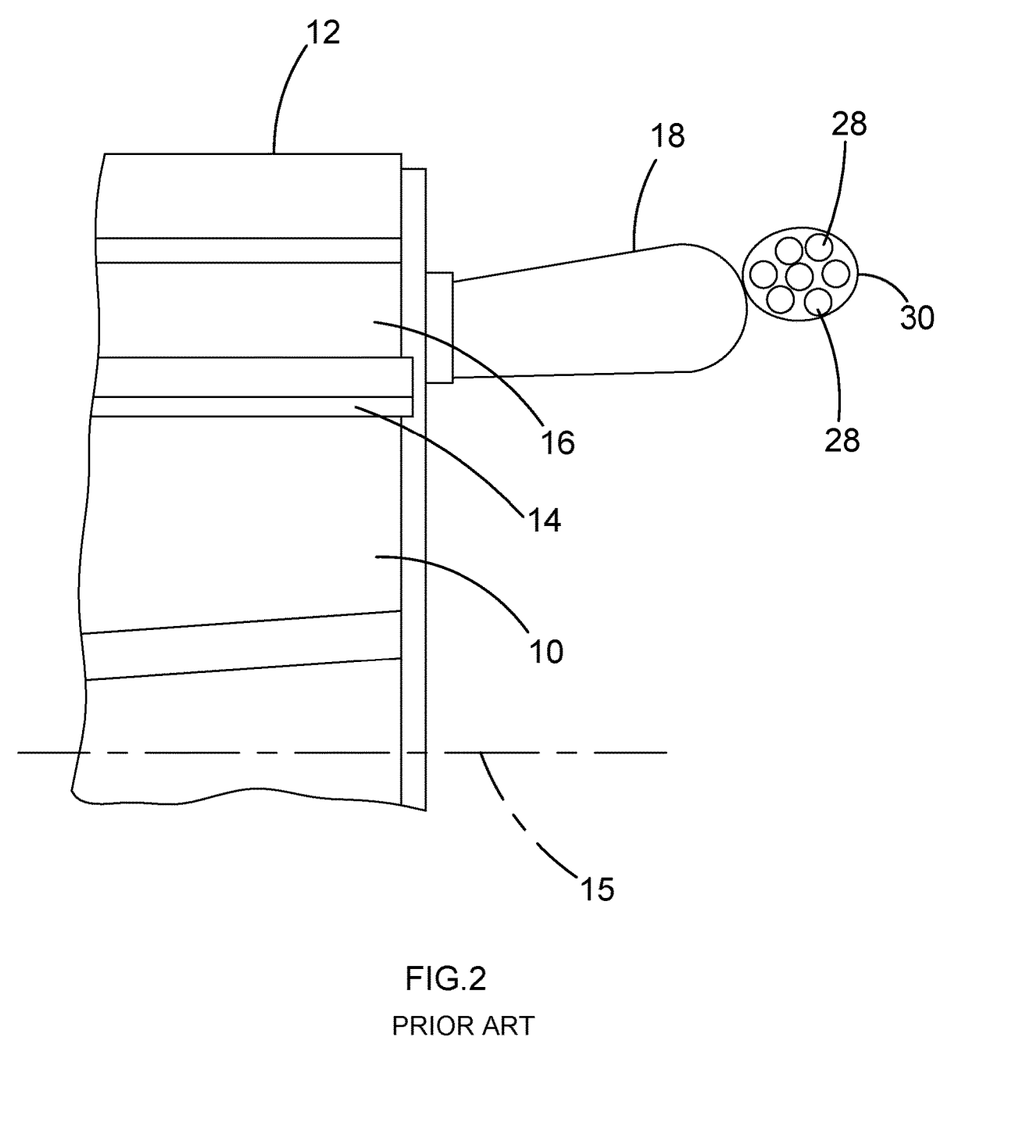
FIG. 2 shows a longitudinal cross section through part of the non-drive end of a known rotating electrical machine.

FIG. 2 shows a longitudinal cross section through part of the non-drive end of a known rotating electrical machine, showing a known end lead arrangement. In FIG. 2, the machine comprises a stator and a rotor essentially as described above. End leads 28 are routed circumferentially around the stator in order to connect the stator windings to the terminal box. The end leads from different coils are bunched together in a ring 30 adjacent to the end windings 18 in an axial direction.

In the arrangement shown in FIGS. 1 and 2 the coil end leads are located on the non-drive end side of the machine. However, it would also be possible to locate coil end leads on the drive end side of the machine as well as or instead of on the non-drive end side.

In practice, it has been found that bunching the end leads together in the way shown in FIG. 2 can lead to excessive temperature rises within the end leads.

Furthermore, locating the end leads axially outwards of the end windings may partially restrict airflow, or deflect airflow away from the end windings. This may reduce the efficiency of the cooling system. In addition, since the end leads may carry different phases, any deterioration in the insulation of the end windings could lead to arcing between the end leads.

Figure 3:
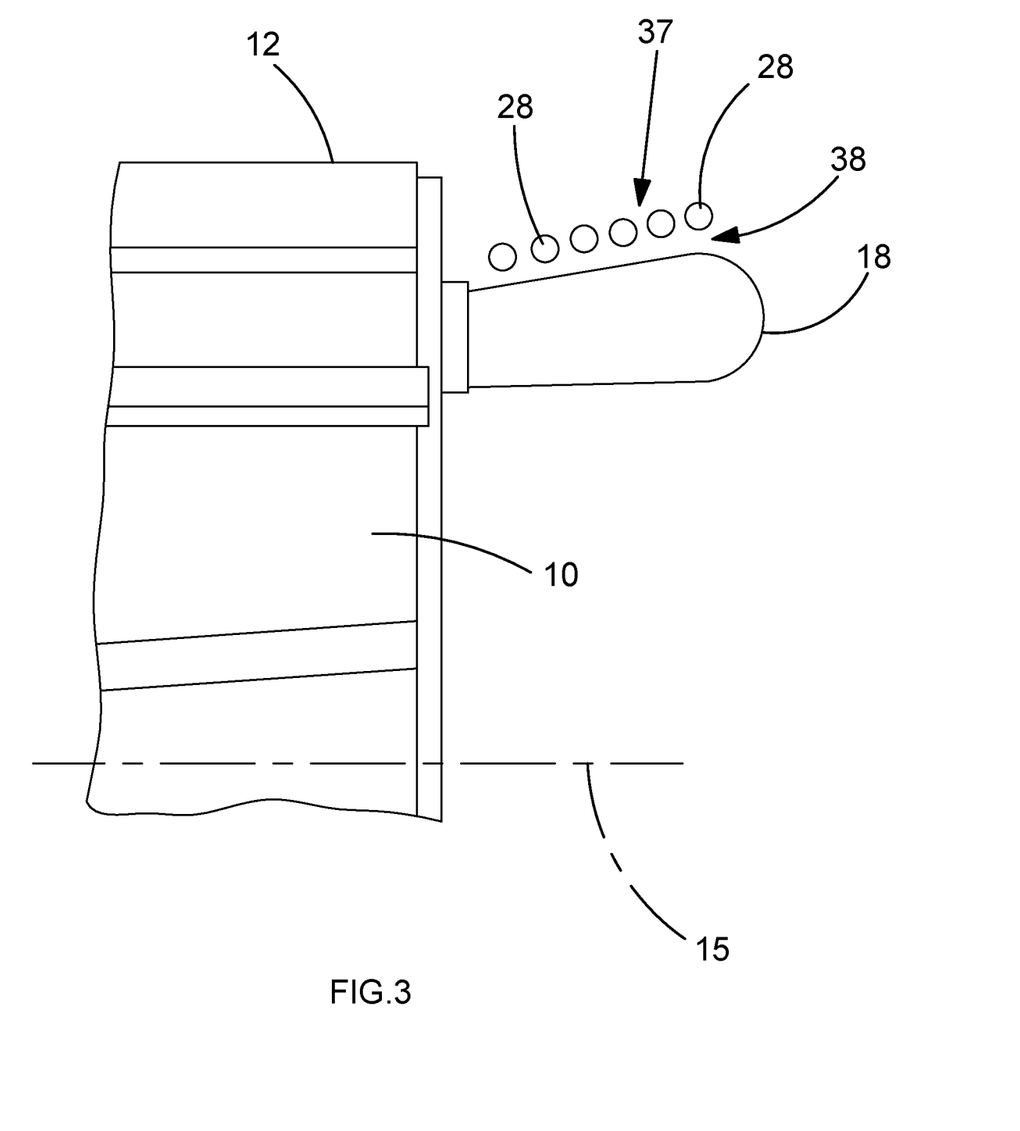
FIG. 3 shows a longitudinal cross section through part of a rotating electrical machine in an embodiment of the present invention.

FIG. 3 shows a longitudinal cross section through part of a rotating electrical machine, illustrating conceptually an arrangement in an embodiment of the present invention. In FIG. 3, the machine comprises a stator and a rotor essentially as described above with reference to FIGS. 1 and 2. As in the example of FIG. 2, the end leads 28 are routed circumferentially around the stator in order to connect the stator windings to a terminal box. However, in the arrangement of FIG. 3, rather than being located adjacent to the end windings 18 in an axial direction, the end leads 28 are located on the radially outwards side of the end windings 18. Furthermore, rather than being bunched together in a ring, the end leads 28 from different coils are spaced apart in a row along the outside of the end windings in a substantially axial direction. As a consequence, air gaps 37 are present between adjacent end leads 28. In this arrangement an airgap 38 is also provided between the end windings 18 and the end leads 28.

It is been found pursuant to the present invention that locating the end leads on the radially outwards side of the end windings as shown in FIG. 3 can allow more cooling air to come into contact with the end leads. Furthermore, moving the end leads away from the end of the end windings may open up airflow paths to the fan, which may help the cooling system to operate more effectively and efficiently. Cooling of the end leads is further enhanced by spacing the end leads apart. Spacing the end leads apart may also help to reduce the risk of arcing. As an additional benefit it has been found that the arrangement of FIG. 3 can result in a more efficient use of space.

In a preferred embodiment of the invention, the following steps are carried out in making a wound stator.

Insertion of Insulation Paper in Slots of Stator

Insulation paper is inserted into the slots of the stator core. The insulation paper acts as thermal insulation between copper wires and stator core.

Copper Coils are Prepared

Copper coils are prepared by winding enamelled wire on a former in accordance with the design requirements. The wire size and number of turns are selected based on the design parameters. The coil shapes and arrangements are selected depending on the type of winding, for example, double layer concentric, double layer lap and so forth. The end leads of the coils are left unwound.

Insertion of Coils in Stator

The coils are then inserted in the stator in such a way that they form the required polarity (for example, example 4 pole) and different phases are kept electrically 120° apart (in the case of a three-phase machine).

End Lead Connections

End leads of the coils are taken out of the stator for connection purposes. The number of end leads taken out depends on the connection style, parallel path, voltage requirements etc. The end leads are routed around the outside of the winding overhang. The end leads are formed in such a way that more air is able to pass over the end leads and the winding overhang, which makes the cooling system more effective and efficient.

Figure 4:
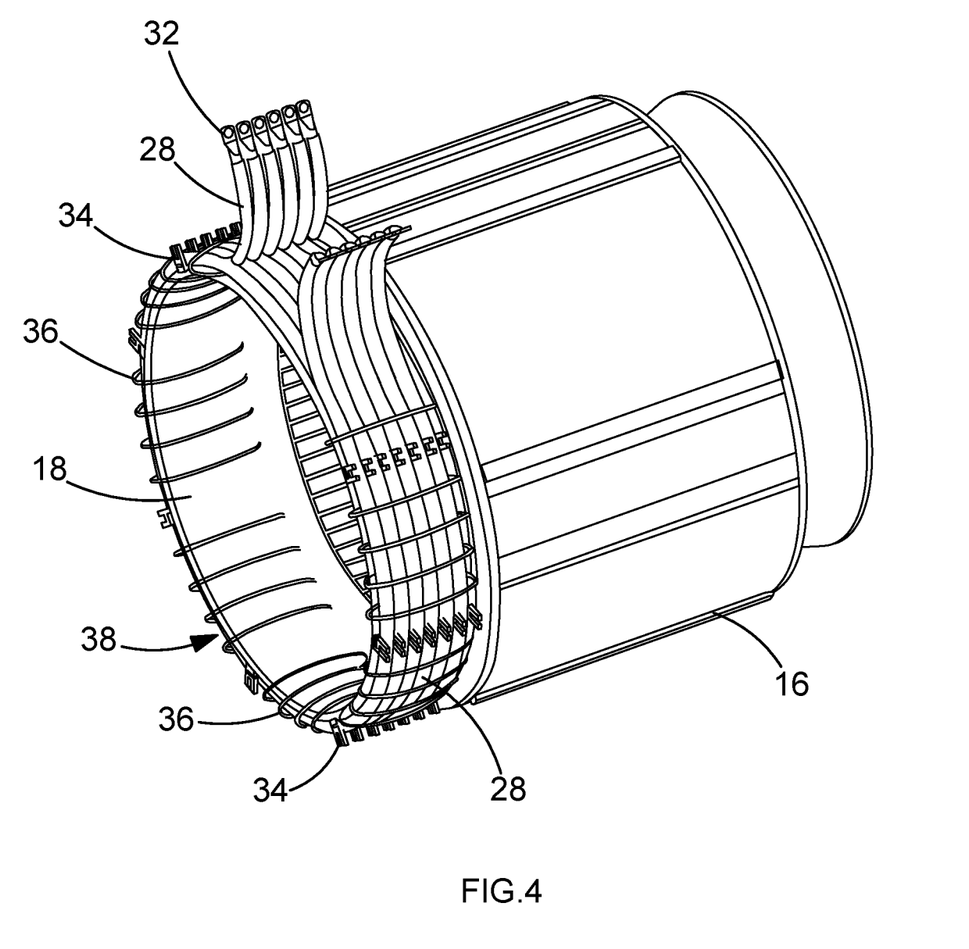
FIG. 4 shows parts of a stator in an embodiment of the present invention.

FIG. 4 shows parts of a stator in accordance with an embodiment of the present invention. Referring to FIG. 4, the stator comprises stator core 16 with stator slots which accommodate stator windings. The stator windings include end windings 18 which extend out of the stator slots and around the outside of the stator core. End leads 28 are provided which are routed circumferentially around the outside of the end windings 18. The end leads 28 from different coils are arranged in a row in a substantially axial direction, and are spaced apart axially. The end leads 28 are provided with connectors 32 for connection to terminals in a terminal box.

Figure 5:
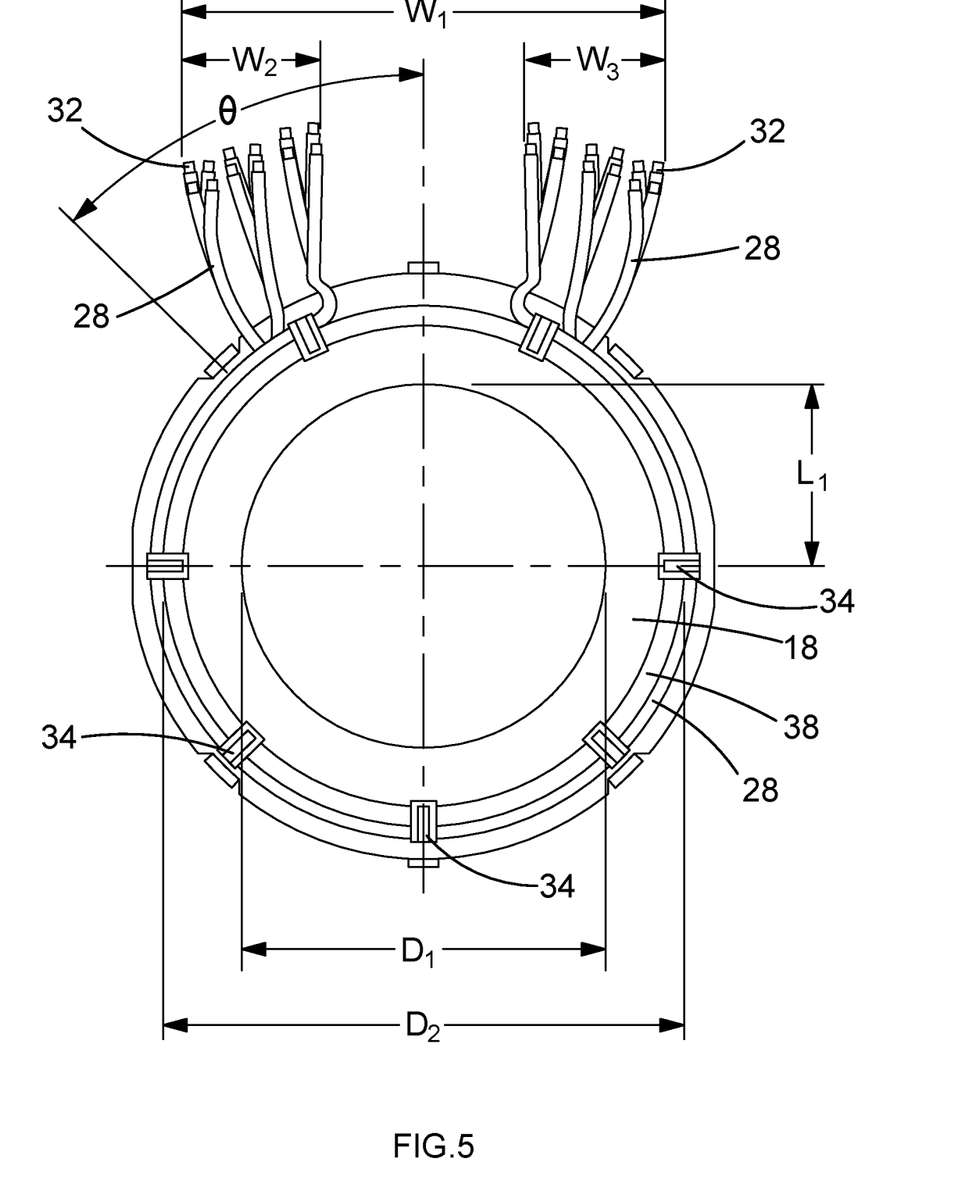
FIG. 5 shows an end view of a stator in an embodiment of the invention.

FIG. 5 shows an end view of a stator in an embodiment of the invention. In the arrangement shown in FIG. 5, the ends of the end leads 28 are grouped in phases ready for connection to the appropriate terminals in a terminal box. The various parameters $W_1$, $W_2$, $L_1$, $D_1$, $D_2$ and $\theta$ are selected in accordance with the size of the machine and the design parameters.

In the arrangements of FIGS. 4 and 5, a plurality of spacers 34 are provided between the end windings 18 and the coil end leads 28 at spaced locations around the end windings. The spacers 34 are used to space the end leads 28 away from the end windings 18 in a radial direction, creating air gaps 38. The spacers 34 also hold the end leads 28 in place and provide gaps between adjacent end leads. In addition, ties 36 are used to hold the end leads 28 on the end windings 18.

Figure 6A:
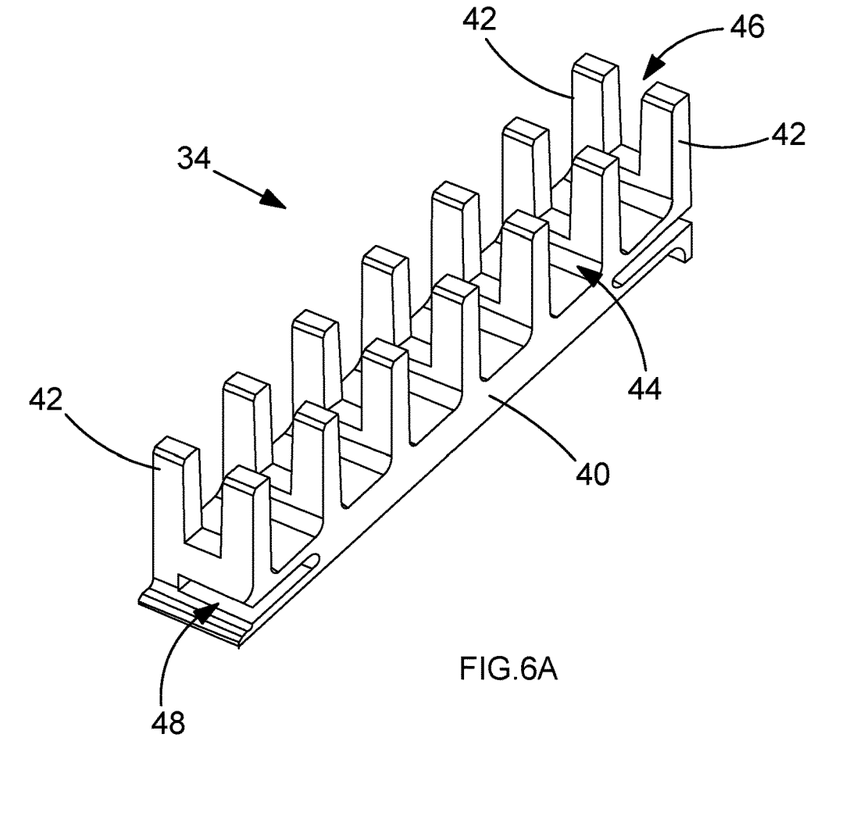
FIGS. 6A and 6B show views of a spacer in accordance with an embodiment of the invention.
Figure 6B:
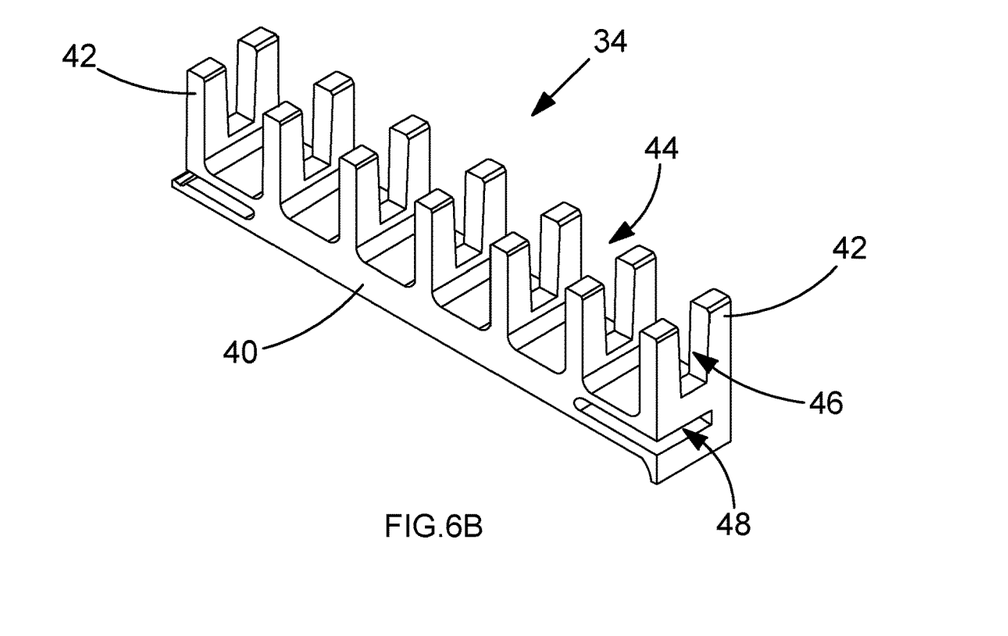

FIGS. 6A and 6B show views of a spacer in accordance with an embodiment of the invention. The spacer 34 of FIGS. 6A and 6B is designed to fit between the end windings 18 and the end leads 28 of a stator as shown in FIGS. 4 and 5.

Referring to FIGS. 6A and 6B, the spacer 34 comprises a base 40 and a plurality of upright members 42. The base 40 is elongate, and extends in a direction which is substantially parallel to the axis of rotation of the machine when the spacer is in place. The upright members 42 are arranged in pairs at spaced locations along the base.

When the spacer 34 is in place, as shown in FIGS. 4 and 5, the upright members 42 extend outwards from the base 40 in a substantially radial direction. The upright members of a pair are adjacent to each other in a circumferential direction, while pairs of upright members are adjacent to each other in an axial direction. The spaces 44 between adjacent pairs of upright members 42 accommodate the end leads 28, with a single end lead normally being located between two adjacent pairs of upright members (although if necessary some doubling up may take place).

The spacer 34 shown in FIGS. 6A and 6B creates an air gap 37 between adjacent end leads 28, as well as the air gap 38 between the end windings 18 and the end leads 28. These gaps provide passages for cooling air to come in contact with the end windings and the end leads, which helps to ensure effective cooling. The gaps 46 between the upright members of a pair also help with cooling. In addition, an axial air passage 48 may be provided through the base 40, to help with cooling and to reduce the amount of material used to form the spacer. The spacer 34 also serves the function of holding the end leads in place, and ensuring sufficient electrical insulation between adjacent end leads.

In the arrangement shown in FIG. 4, ties 36 are used to tie the end leads 28 to the end windings 18. Since the base 40 of a spacer 34 is located between the end windings 18 and the end leads 28, this also clamps the spacer 34 in place without the need to provide a separate connection point for the spacer. Although not shown, a tie may also or instead be co-located with a spacer, and may run between the upright members of a pair.

The spacer 34 may be, for example, moulded from a temperature resistant plastic. However, any other appropriate material or manufacturing technique may be used instead.

Figure 7:
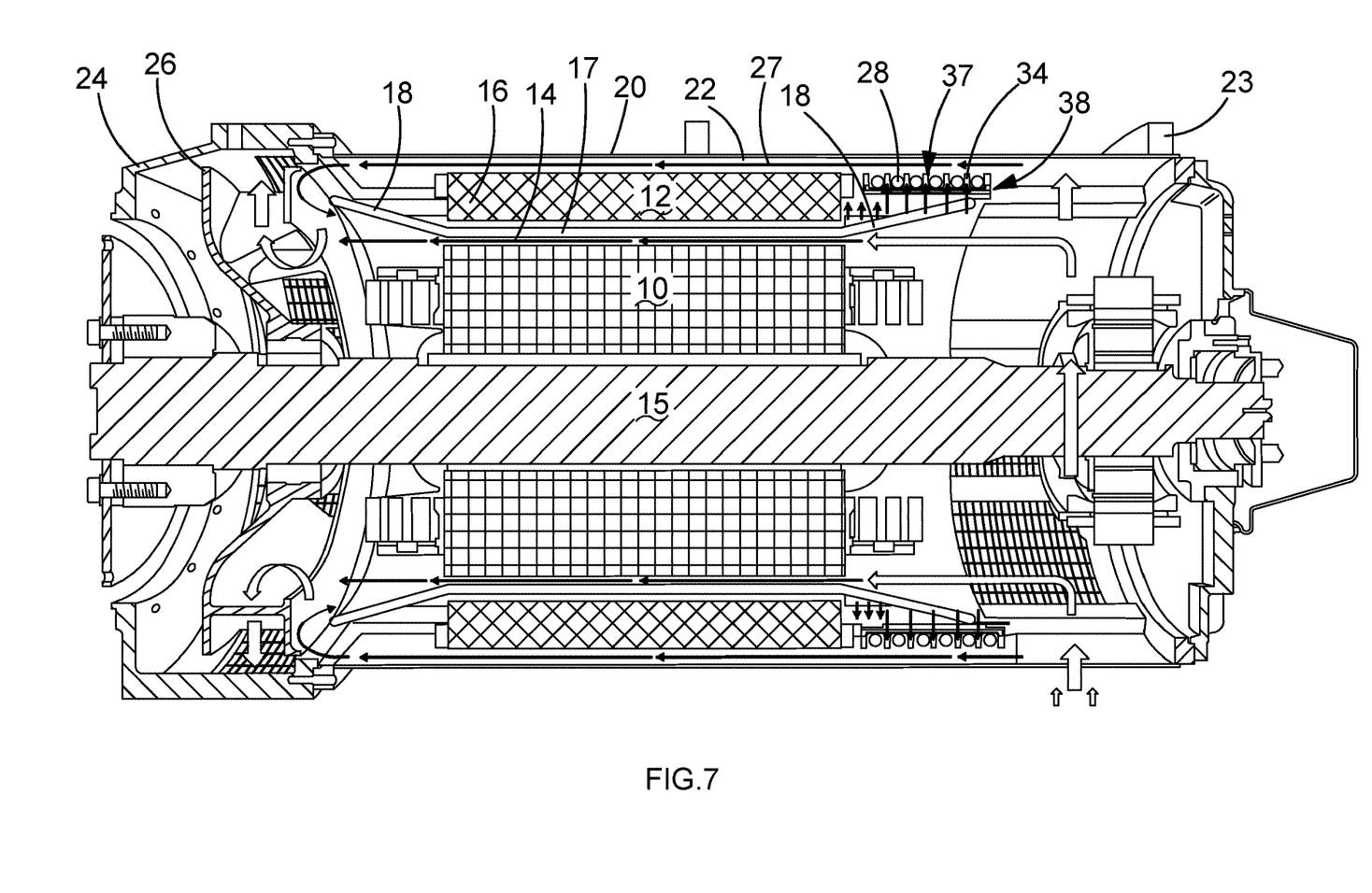
FIG. 7 shows a longitudinal cross section through parts of a rotating electrical machine in an embodiment of the invention.

FIG. 7 shows a longitudinal cross section through parts of a rotating electrical machine in an embodiment of the invention, showing airflow through the machine. Referring to FIG. 7, it can be seen that air flows through the air gap 38 between the end windings 18 and the end leads 28, and then radially outwards through the air gaps 37 between adjacent end leads 28. This helps to ensure effective cooling of both the end leads and the end windings.

In tests carried out by the present applicant, at 400V and 50 Hz the temperature of the end leads was found to be reduced by 46.4K and at 480V and 60 Hz the temperature of the end leads was found to be reduced by 49.2K, in comparison to the previous design. This significant reduction in temperature can allow the machine to operate more efficiently and/or allow the power rating of the machine to be increased.

It will be appreciated that embodiments of the present invention have been described by way of example only, and variations in detail may be made within the scope of the appended claims. For example, the electrical machine may be single phase, 3-phase, or have any other number of phases. Any appropriate number of coils may be used in the stator windings. The stator windings may use various different winding configurations, such as concentrated, distributed, lapped, single layer, double layer windings, triple layer, or any other appropriate configuration. The connection side of the machine may be at the non-drive end, or the drive end, or both. Other modifications in detail will be apparent to the skilled person.

The invention claimed is:

1. A stator of a rotating electrical machine, the stator comprising:
    a stator core comprising stator slots; and
    a plurality of stator coils, the stator coils comprising:
        side windings located in the stator slots,
        end windings which extend out of the stator slots, and
        end leads for connecting the stator coils, and
    wherein each stator coil is wound from a single continuous conductor, and each end lead is part of the same continuous conductor as the side windings and the end windings of the stator coil,
    wherein at least some of the end leads run circumferentially around a radially outwards side of the end windings,
    wherein the stator further comprises a plurality of spacers located between the end windings and the end leads,
    wherein each of the plurality of spacers comprises a base and a plurality of upright members, the end leads are accommodated between adjacent upright members, and the base is located against the end windings so as to space the end leads away from the end windings in a radial direction,
    wherein the plurality of spacers are provided at a plurality of spaced locations circumferentially around the end windings, and
    wherein the plurality of spacers create air gaps in a radial direction between the end windings and the end leads.

2. The stator according to claim 1, wherein the end leads are arranged in a row along the outside of the end windings.

3. The stator according to claim 1, wherein the end leads from different coils are spaced apart from each other.

4. The stator according to claim 1, wherein the machine is a multiphase machine, and end leads of different phases are spaced apart from each other.

5. The stator according to claim 1, wherein the plurality of spacers create air gaps between adjacent end leads.

6. The stator according to claim 1, wherein the plurality of spacers hold the end leads in place.

7. The stator according to 1, wherein the plurality of spacers provide electrical insulation between adjacent end leads.

8. The stator according to claim 1, wherein the base extends in a direction which is substantially parallel to the axis of rotation of the machine, and the upright members extend outwards from the base in a substantially radial direction.

9. The stator according to claim 1, wherein the upright members are arranged at a plurality of spaced locations along the base.

10. The stator according to claim 1, wherein the upright members are arranged in pairs, and the upright members of a pair are adjacent to each other in a circumferential direction.

11. The stator according to claim 10, wherein pairs of upright members are adjacent to each other in an axial direction.

12. The stator according to claim 1, wherein the base comprises an axial air passage.

13. The stator according to 1, wherein means are provided for holding the end leads on the end windings, and the plurality of spacers are held between the end windings and the end leads.

14. A method of manufacturing a stator for a rotating electrical machine, the method comprising:
    inserting stator coils into stator slots in a stator core such that end windings extend out of the stator slots;
    routing coil end leads circumferentially around a radially outwards side of the end windings, wherein each stator coil is wound from a single continuous conductor and each end lead is part of the same continuous conductor as the side windings and the end windings of that stator coil; and
    inserting a plurality of spacers at spaced locations circumferentially around the end windings,
    wherein each spacer comprises a base and a plurality of upright members, and the end leads are accommodated between adjacent upright members,
    wherein the base is placed against the end windings so as to space the end leads away from the end windings in a radial direction, and
    wherein the plurality of spacers create air gaps in a radial direction between the end windings and the end leads.

15. A stator of a rotating electrical machine, the stator comprising:
    a stator core comprising stator slots; and
    a plurality of stator coils, the stator coils comprising:
        side windings located in the stator slots,
        end windings which extend out of the stator slots, and
        end leads for connecting the stator coils,
    wherein at least some of the end leads run circumferentially around a radially outwards side of the end windings,
    further comprising at least one spacer between the end windings and the end leads,
    wherein the spacer comprises a base and a plurality of upright elements, and the end leads are accommodated between adjacent upright members, and
    wherein the base comprises an axial air passage.

* * * * *